United States Patent
Zhou et al.

(10) Patent No.: US 9,942,893 B1
(45) Date of Patent: Apr. 10, 2018

(54) SYSTEMS AND METHODS FOR ALLOCATING PHYSICAL RESOURCES IN A COMMUNICATION SYSTEM

(71) Applicant: Sprint Spectrum LP, Overland Park, KS (US)

(72) Inventors: Yu Zhou, Herndon, VA (US); Muhammad Ahsan Naim, Ashburn, VA (US); Luca Zappaterra, Arlington, VA (US)

(73) Assignee: Sprint Spectrum LP., Overland Park, KS (US)

( * ) Notice: Subject to any disclaimer, the term of this patent is extended or adjusted under 35 U.S.C. 154(b) by 240 days.

(21) Appl. No.: 14/848,422

(22) Filed: Sep. 9, 2015

(51) Int. Cl.
*H04W 72/04* (2009.01)
*H04W 24/02* (2009.01)

(52) U.S. Cl.
CPC ......... *H04W 72/044* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 8,553,591 B2 | 10/2013 | Jiang et al. | |
| 2011/0310777 A1* | 12/2011 | Jiang | H04W 72/04 370/280 |
| 2013/0039320 A1 | 2/2013 | Arima | |
| 2014/0153453 A1* | 6/2014 | Park | H04B 7/2656 370/280 |
| 2014/0198776 A1* | 7/2014 | Nammi | H04B 7/0486 370/336 |
| 2015/0092761 A1* | 4/2015 | Kim | H04L 1/0025 370/336 |

* cited by examiner

*Primary Examiner* — Anh Ngoc Nguyen

(57) ABSTRACT

In systems and methods for allocating physical resources in a communication system, a common periodicity of two or more allocations for a communication between a wireless device and an access node is determined. A permissible division of a data unit in at least two transmission time intervals in a single carrier within one of the two or more allocations is also determined.

20 Claims, 7 Drawing Sheets

SYSTEMS AND METHODS FOR ALLOCATING PHYSICAL RESOURCES IN A COMMUNICATION SYSTEM

TECHNICAL BACKGROUND

Communication systems commonly share resources between a plurality of wireless devices. The number of wireless devices utilizing a node in the communication system can vary significantly over time. This can cause varying demands on the communication system, which can affect the experience of the user of the wireless device. Additionally, nodes in the communication system represent a considerable capital investment. Accordingly, various techniques have been developed to optimize the utilization of the nodes in the communication system taking into consideration the user's experience and the capital cost of the nodes.

Some of the techniques are directed to allocating physical resources, such as wireless resources to the wireless devices. Such allocations can include assigning wireless devices to particular frequency bands, a strong or weaker signal, or the like, depending on the needs of a particular wireless device. The allocations can also include assigning particular carriers or subcarriers for use by an application on the wireless device. The allocations utilize a control channel (e.g., PDCCH), which can consume the physical resources. Reducing the use of a control channel for such allocations may result in a more optimal use of the physical resources.

OVERVIEW

In an embodiment, a method of allocating physical resources in a communication system includes determining a common periodicity of two or more of the allocations for a communication between a wireless device and an access node. The method also includes determining a permissible division of a data unit in at least two transmission time intervals in a single carrier within one of the two or more the allocations. In an embodiment, the method also determines a common size of the two or more allocations for a communication between the wireless device and the access node. In an embodiment, determining a permissible division of the data unit into the two or more transmission time intervals comprises determining the permissible number of contiguous transmission time intervals into which the data unit may be divided.

In an embodiment, a method of allocating physical resources in a communication system includes allocating at least two transmission time intervals into which a data unit may be divided. The method also includes dividing the data unit into the at least two transmission time intervals in a single carrier. In an embodiment, the method determines a common time periodicity of at least two or more of the allocations. In an embodiment, dividing the data unit into the at least two transmission time intervals comprises dividing the data unit into two or more contiguous transmission time intervals.

In an embodiment, a communication system configured to allocate physical resources includes one or more network nodes configured to determine a common periodicity of two or more allocations for a communication between an access node and a wireless device and determine at least two transmission time intervals in a single carrier into which a data unit may be divided. In an embodiment, the one or more network nodes are further configured to determine a common size of the two or more allocations between a wireless device and an access node.

DETAILED DESCRIPTION

In an embodiment, an access node allocates physical resources, such as wireless resources, to a wireless device. The wireless resources are allocated as physical resource blocks with subcarriers and a time periodicity. The wireless device uses the allocated physical resource blocks to send to and receive data from the access node over a wireless communication link. The quality of the communication link may vary, which can cause the symbol rate to decrease. As a result more physical resource blocks may be required to communicate a data unit, such as a MAC protocol data unit, to the access node. To optimize the utilization of the resources in the communication system, the data unit may be divided into two or more transmission time intervals in a single carrier. Dividing the data unit into two or more transmission time intervals may be more optimal than, for example, performing radio link control concatenation or sending redundant data units over several carriers.

Figure 1:
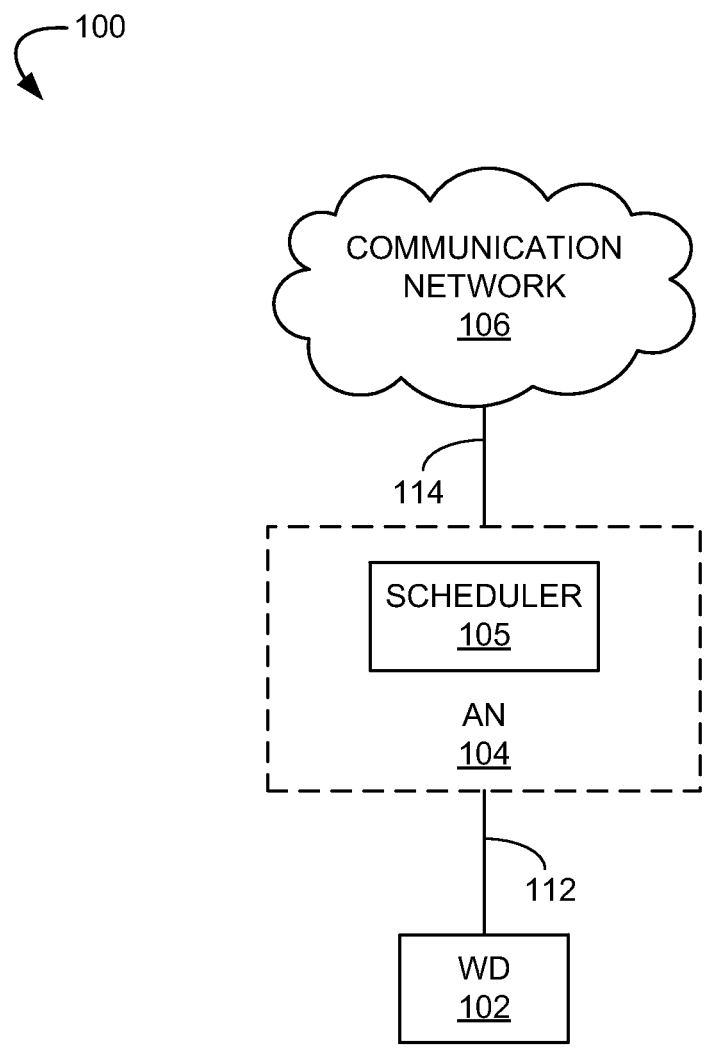
FIG. 1 is a block diagram illustrating a communication system configured to allocate physical resources.

FIG. 1 is a block diagram illustrating a communication system 100 configured to allocate physical resources. Communication system 100 is a communication network that can provide wireless communication to one or more wireless devices 102. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Other network elements may be present in communication system 100 to facilitate wireless communication to/from wireless device 102 but are omitted for clarity, such as base stations, base station controllers, gateways, mobile switching centers, dispatch application processors, and location registers such as a home location register or visitor location register. Furthermore, other network elements may be present to facilitate communication between access node 104 and network 106 which are omitted for clarity, including additional processing nodes, routers, gateways, and physical and/or wireless data links for carrying data among the various network elements.

Wireless device 102 can be any device configured to communicate over system 100 using a wireless communication link. For example, wireless device 102 can include a cell phone, a smart phone, a computing platform such as a laptop, palmtop, or a tablet, a personal digital assistant, or an internet access device, and combinations thereof. It is noted that while one wireless device is illustrated in FIG. 1 as being in communication with access node 104, any number of wireless devices can be implemented according to various exemplary embodiments disclosed herein.

The wireless interface of wireless device 102 can include one or more transceivers for transmitting and receiving data over communication system 100. The transceiver can be associated with the same or different frequency bands, the same or different radio access technologies, the same or different network providers, and/or the same or different services. For example, wireless device 102 can include a transceiver that is associated with one or more of the following: Code Division Multiple Access (CDMA), Global System for Mobile communications (GSM), Worldwide Interoperability for Microwave Access (WiMAX), Long-Term Evolution (LTE), and/or High-Speed Downlink Packet Access (HSDPA), IEEE 802.11, Wireless Fidelity (Wi-Fi), Bluetooth, Zigbee, Infrared Data Association (IrDA), Multimedia Broadcast Multicast Service (MBMS), etc.

Wireless device 102 can be in communication with access node 104 through communication link 112. Communication link 112 can use various communication media, such as air, space, metal, optical fiber, or some other signal propagation path—including combinations thereof. Communication link 112 may comprise many different signals sharing the same link. Communication link 112 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless link, but be transferred over different communication sessions, frequencies, timeslots, packets, ports, sockets, logical transport links, or in different directions—including combinations thereof.

Wireless device 102 can transmit and/or receive information over communication system 100 using various communication services. These services can include various voice, data, and/or MBMS services and applications. For example, mobile voice services, mobile data services, push-to-talk services, internet services, web browsing, email, pictures, picture messaging, video, video messaging, broadcast video, audio, voicemail, music MP3's, ring tones, stock tickers, new alerts, etc.

Access node 104 can be any network node configured to provide communication between wireless device 102 and communication network 106. Access node 104 can include scheduler 105 and can be any network node configured to provide communication between wireless device 102 and communication network 106. Access node 104 can be short range access node or a standard access node. A short range access node could include a microcell base station, a picocell base station, a femtocell base station, or the like. A standard access node could include Base Transceiver Stations (BTSs), Radio Base Stations (RBSs), Radio Network Controllers (RNCs), a NodeB device, or an enhanced NodeB (eNodeB) device, or the like. It is noted that while one access node 104 is illustrated in FIG. 1, any number of access nodes can be implemented within system 100.

Access node 104 can comprise a processor and associated circuitry to execute or direct the execution of computer-readable instructions to obtain information. Access node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 104 can receive instructions and other input at a user interface.

Access node 104 provides shared radio resources to multiple wireless devices. The shared radio resources can include physical resources associated with the communication link 112, such as subcarriers. The carriers or subcarriers can be at specific frequencies modulated with symbols that can carry data. Accordingly, the physical resources can be viewed as blocks of carriers or subcarriers that are utilized for a period of time. That is, the block can have a length and width that correspond to a number of carriers or subcarriers and the transmission time. The transmission time for a block may be referred to as the transmission time interval (TTI). These blocks of physical resources are sometimes referred to as physical resource blocks (PRB), which are discussed in more detail below with reference to FIGS. 4 and 5.

The scheduler 105 can allocate the physical resources to the wireless device 102. For example, the scheduler 105 can determine a periodicity (e.g., how frequent is the physical resource assigned) and size (e.g., number of carriers×number of TTIs) of a physical resource to allocate to the wireless device 102. The periodicity may be how frequent the allocation is available to the wireless device 102 to transmit data. Using a control channel (e.g., PDCCH in LTE), the scheduler 105 can communicate the periodicity and size of the physical resource to the wireless device 102. Accordingly, the wireless device 102 may use the allocated physical resources to communicate with the access node 104, which is in communication with the communication network 106.

Communication network 106 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 106 can be capable of carrying data, for example, to support voice, push-to-talk, broadcast video, and data communications by a wireless device, for example, wireless device 102. Wireless network protocols can comprise Code Division Multiple Access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 106 comprise Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). Communication network 106 can also comprise additional base stations, controller nodes, telephony switches, internet routers, network gateways, computer systems, communication links, or some other type of communication equipment, and combinations thereof.

Communication link 114 can be wired or wireless and use various communication protocols such as Internet, Internet Protocol (IP), Local-Area Network (LAN), optical networking, Hybrid Fiber Coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Links 112, 114 can be a direct link or might include various equipment, intermediate components, systems, and networks.

In operation, access node 104 may communicate with wireless device 102. In an exemplary embodiment, the access node 104 may provide wireless communication services to multiple carriers and subcarriers on different frequency bands (e.g., 1.25 GHz carrier, 1900 MHz carrier, 800 MHz carrier, etc.) and channels (e.g., 5 MHz channels, 10 MHs channels, 15 MHz channels, etc.). Access node 104 may utilize scheduler node 105 to coordinate transmissions of wireless resources (e.g., the next available physical resource blocks (PRBs), wireless spectrum, etc.) among connected wireless device, such as the wireless device 102.

The scheduler 105 may allocate the physical resources for a particular application. For example, the allocations may be for a voice communication, which may utilize a repeated pattern of PRBs. The PRBs are used by the wireless device 102 to communicate data units, such a protocol data units (PDUs), with the access node 104. If the communication link 112 has a good quality, then data units may use only a single PRB. However, if the communication link 112 is in less reliable condition, the scheduler 105 may adjust the modulation carrier scheme (MCS) of the carriers or subcarriers. For example, the scheduler 105 may, considering various conditions, such as the condition of the air interface between the wireless device 102 and the access node 104 and, based on those conditions, change the MCS. As a result, more PRBs are needed for a given data unit, as the following explains in more detail.

Figure 2:
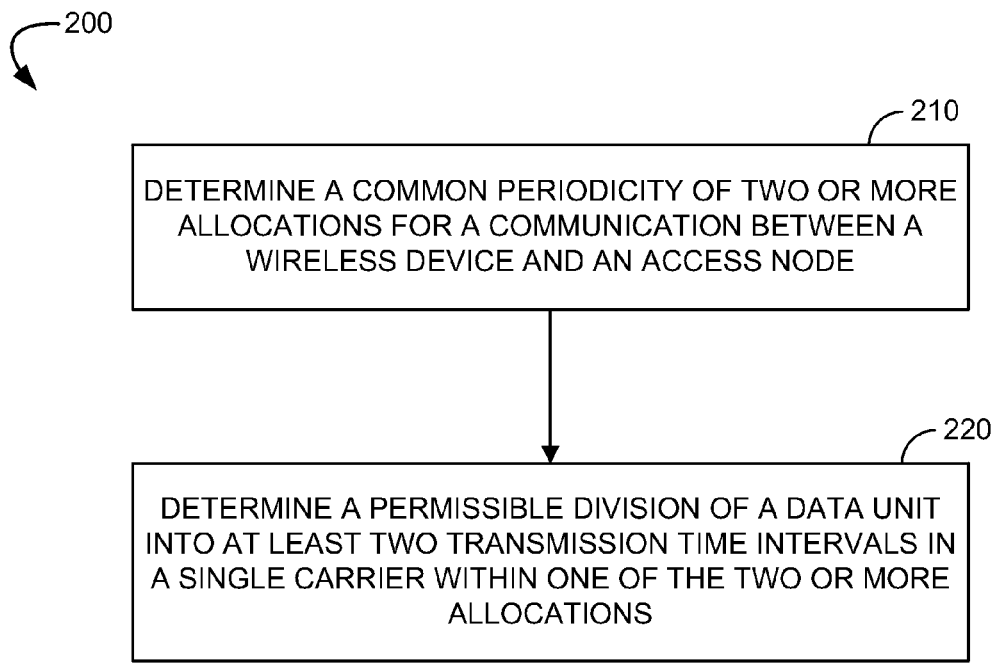
FIG. 2 is a method of allocating data units in a communication system.

FIG. 2 is a method 200 of allocating data units in a communication system. In operation 210, a common periodicity of two or more allocations of a physical resource for a communication between a wireless device and an access node. The allocation may be made by assigning particular PRBs for an application in the wireless device 102, such as voice communication. The allocation may also define how frequent the PRBs may be employed for that application or the periodicity of the communication. For example, the wireless device 102 may send a data every 20 ms for voice communication.

In operation 220, a permissible division of a data unit may be determined. For example, when the communication link 112 has a good quality, the data rate may be sufficient such that a single PRB may be employed to communicate a data unit, such as a MAC data unit. However, when the quality of the communication drops due to for example, distance, the data unit may be divided into at least two transmission time intervals in a single carrier. That is, the data unit is not reproduced in two transmission time intervals, but that the data unit is divided into the two transmission intervals. The division of the data may be employed in a various scheduling schemes, as the following illustrates.

Figure 3A:
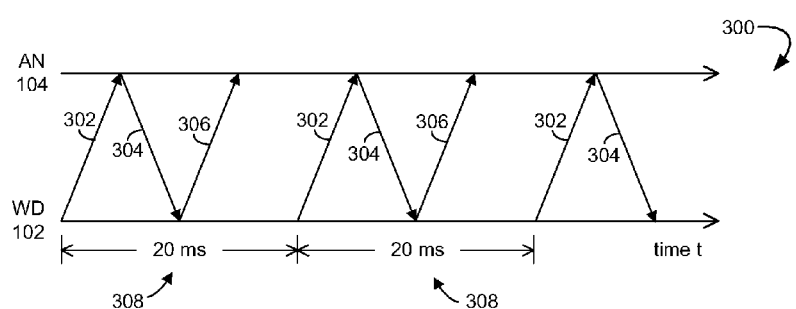
FIGS. 3A and 3B are diagrams illustrating a scheduling in a communication system.
Figure 3B:
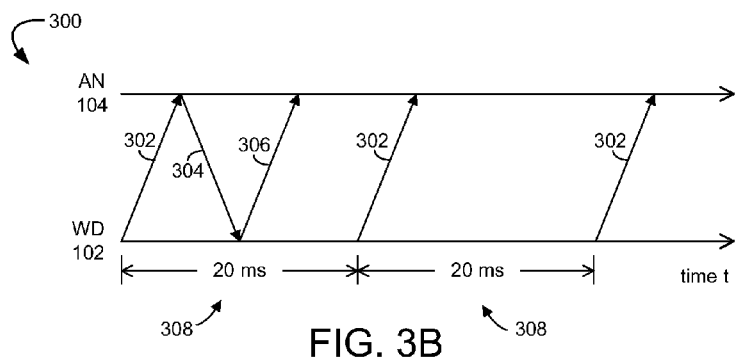

FIGS. 3A and 3B are diagrams illustrating a scheduling 300 in a communication system. The scheduling 300 may be performed by the access node 104 and, in particular, the scheduler 105 described in the foregoing. The scheduling 300 is comprised of a request 302, a grant 304, and status 306. The grant 304 is performed by the access node 104 after receiving the request 302 from the wireless device 102. After receiving the grant 304, the wireless device 102 sends the status 306 to the access node 104. The request 302, grant 304, and status 306 are sent within a periodicity 308 of 20 ms. Other periodicities 308 may be employed, such as 10 ms, or the like.

As shown in FIGS. 3A and 3B, the scheduling 300 may be comprised of dynamic scheduling or persistent (e.g., semi-persistent) scheduling. In FIG. 3A, dynamic scheduling is illustrated. In dynamic scheduling, the periodicity 308 and network identifier (e.g., C-RNTI) are allocated to the wireless device 102 within every periodicity 308. The periodicity 308 can therefore be adjusted depending on network conditions, application requirements, or the like. However, allocating resource every periodicity 308 consumes resources in the control channel used to allocate the periodicity and size. That is, allocating the physical resources can consume an undesirable amount of the physical resources.

In FIG. 3B, persistent scheduling is illustrated. In persistent scheduling, the periodicity 308 and size of the allocation are set in the wireless device 102 for two or more allocations. For example, the grant 304 shown in FIG. 3B can allocate a common periodicity of 20 ms and a common size of a given number of PRBs for a defined or indefinite number of periods until various factors change (e.g., packet size, radio channel conditions, etc.). As can be appreciated, physical resources are not used to communicate the allocation in each periodicity.

Figure 4:
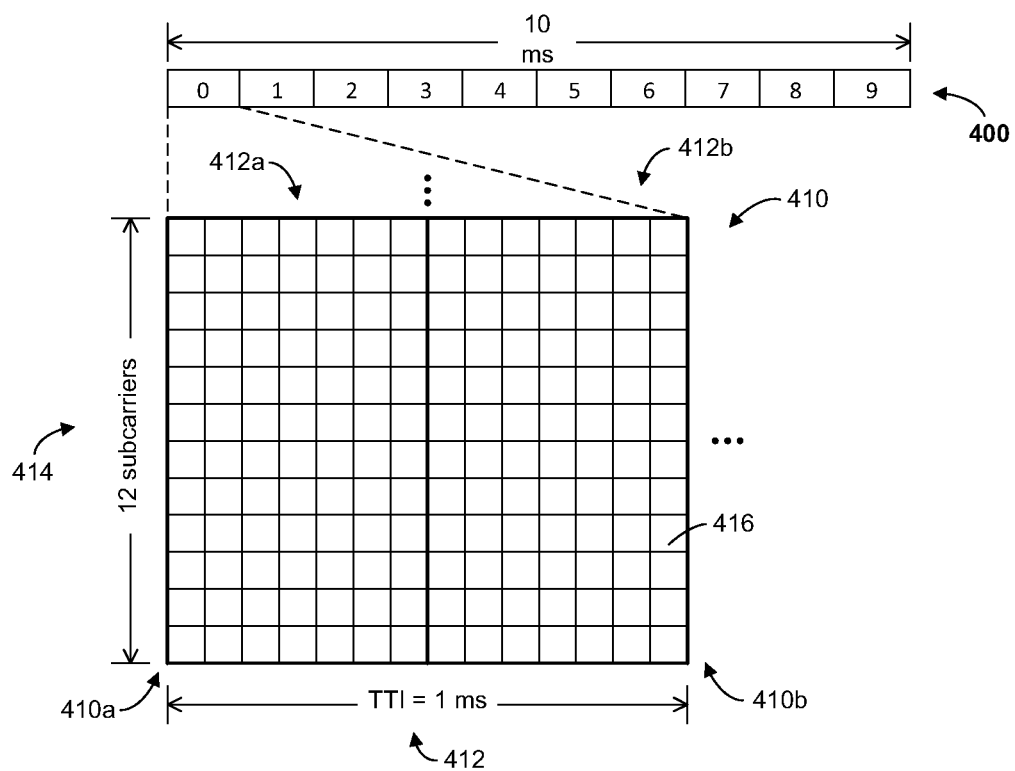
FIG. 4 shows an allocation of physical resources in a communication system.

FIG. 4 shows an allocation 400 of physical resources in a communication system. The allocation 400 may be to a wireless device 102 by the access node 104. The allocation 400 is a frame that is 10 ms wide and has 10 sub-frames numbered consecutively from 0-9. Each of the ten sub-frames includes a first and second PRB 410a and 410b. The subframe 410 has a transmission time interval 412 of 1 ms. The subframe 410 also has a carrier 414 with 12 subcarriers. However, alternative subframes and/or PRBs may have more or fewer subcarriers and/or larger or smaller transmission time intervals.

The transmission time interval 412 includes a first slot 412a and a second slot 412b. Each slot 412a, 412b is 7 symbols wide, although alternative number of symbols, such as 6, may be employed in alternative embodiments. The slots 412a, 412b are comprised of the first and second PRB 410a, 410b, which are usually called one PRB pair. Each square in the first and second PRB 410a, 410b is comprised of a single symbol and a single subcarrier. Each square in the first and second PRB 410a, 410b may be referred to as a resource element 416. As discussed above, the first and second PRB 410a, 410b may be allocated by the access node 104. However, also as discussed above, the number of PRB pairs needed for an application may vary depending on changes in the quality of the communication link 112.

Figure 5:
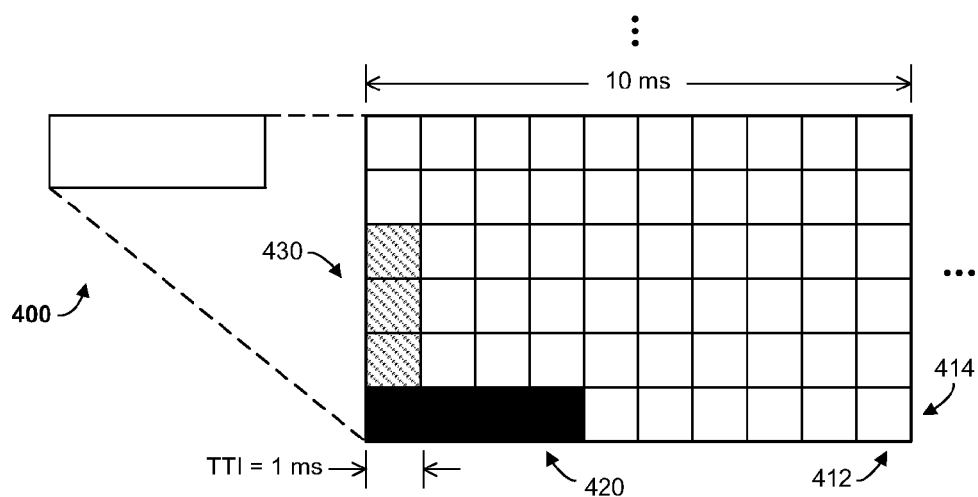
FIG. 5 shows the allocation comprised of a plurality of subframes.

FIG. 5 shows the allocation 400 comprised of a plurality of subframes 410 of FIG. 4. The allocation 400 is shown with the transmission time intervals 412 and the carriers 414 described in the foregoing with reference to FIG. 4. Also shown is a data unit 420 (solid black fill) divided into four transmission time intervals in a single carrier. Also shown, by way of comparison, is a data unit 430 reproduced in several carriers in a single time interval (illustrated by the pattern fill).

When the signal quality is sufficient, the data unit 420 may only occupy a single PRB pair (e.g., the bottom left square). That is, only a single PRB pair is required to transmit the data unit. The data unit 420 may be a MAC data unit, although any suitable data unit may be employed. As discussed above, the size of the allocation 400 may be determined by the scheduler 105. The allocation may also be persistent or semi-persistent.

Also as discussed in the above, the scheduler 105 may change the MCS each carrier 414. As a result, the amount of data that can be transmitted in a single PRB pair may decrease due to, for example, the wireless 102 travelling further from the access node 104. The wireless device 102 can also increase the transmission power, but the transmission power may be limited. Accordingly, the coverage of the wireless device 102 may be limited by the power and data requirements of an application.

Dividing the data unit into two or more transmission time intervals in a single carrier can increase the coverage of the wireless device 102. For example, as explained above, the scheduler 105 can reduce the data rate of the communication link 112 by changing the MCS. As a result, more PRB pairs are needed for a given data unit. However, reducing the data rate can increase the range of the wireless device 102 for a given transmission power. By dividing the data unit into two or more transmission time intervals in a single carrier, the lower data rate may be utilized.

The data unit divided between the two or more transmission time intervals may be a protocol data unit (PDU). For example, a MAC PDU may be divided between into two or more transmission time intervals in a single carrier. The MAC PDU may include a MAC header and a padding. The MAC PDU may carry a service data unit (SDU) that can be passed to a higher layer in a protocol stack, as the following will illustrate. The division of the MAC PDU may be in the SDU portion of the MAC PDU. The division of the data unit is explained in more detail in the following with reference to FIG. 6.

Figure 6:
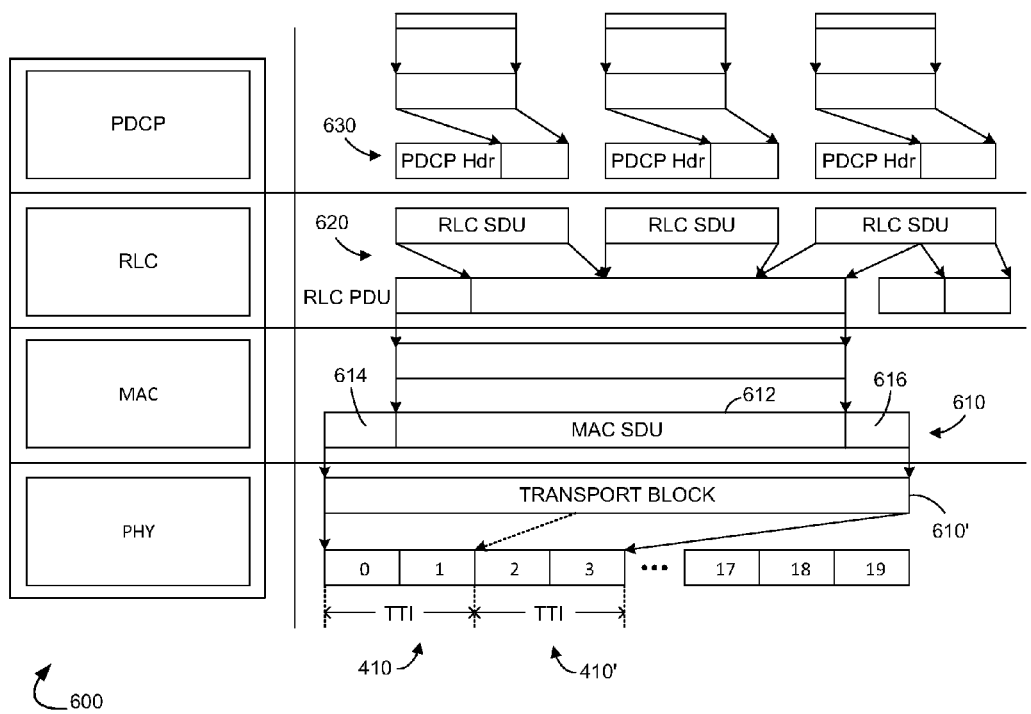
FIG. 6 shows an allocation of physical resources in a protocol stack.

FIG. 6 shows an allocation of physical resources in a protocol stack 600. The protocol stack 600 shown is a radio protocol stack. The protocol stack 600 includes a MAC protocol data unit (PDU) 610 with a MAC service data unit (SDU) 612. The MAC SDU 612 is exchanged between a MAC layer and a radio link control (RLC) layer. In the RLC layer, RLC SDUs are concatenated with two different RLC PDUs 620. In the packet data convergence protocol (PDCP) layer, the RLC SDUs 620 are PDCP PDUs 630, which are comprised of data packets, such as IP protocol data packets, and a PDCP header. At the bottom of the protocol stack 600, the MAC PDU 610 is comprised of the MAC SDU 612 between a MAC header 614 and a MAC padding 616. The MAC PDU 610 is a transport block 610' in the PHY layer.

In the PHY layer, the MAC PDU 610 is divided into two TTIs in a single carrier, which is illustrated by the subframes 410, 410'. As shown, the entire MAC PDU 610 is divided into sequential TTSs in a single carrier. Due to the sequential division of the MAC PDU 610 into the single carrier, the subframes 410, 410' are shown as being contiguous. However, the MAC PDU 610 may be divided into non-contiguous TTIs, such as slots 0 and 1 and then slots 18 and 19, and still be divided into the single carrier of the PHY layer.

By way of comparison, the RLC segmentation described above does not divide the data unit into two TTIs in a single carrier. The RLC segmentation divides the SDU into two RLC PDUs 620 in the RLC layer. When the MAC PDU 610 is not divided between the two TTIs in a single carrier, the RLC segmentation results in a MAC PDU divided between two more carriers among one or more TTIs. By dividing the MAC PDU 610 into two or more TTIs in a single carrier, only a single subframe 410 (two PRBS 410a, 410b in the single carrier) may be used per TTI. This can reduce or eliminate the overhead associated with RLC segmentation, such as the additional RLC headers.

Dividing the MAC PDU 610 into two or more TTIs in a single carrier can also reduce or eliminate the overhead associated with other techniques. For example, one technique is to transmit redundant MAC PDUs 610 in two or more PRBs. This technique may be referred to as TTI-bundling. As can be appreciated, TTI bundling can consume more PHY resources than dividing the MAC PDU 610 into two or more TTIs in a single carrier. As can also be appreciated, TTI bundling can reduce the available physical resources for the other wireless devices in communication with the access node 104.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: wireless device 102, access node 104, and/or a node in the communication network 106.

Figure 7:
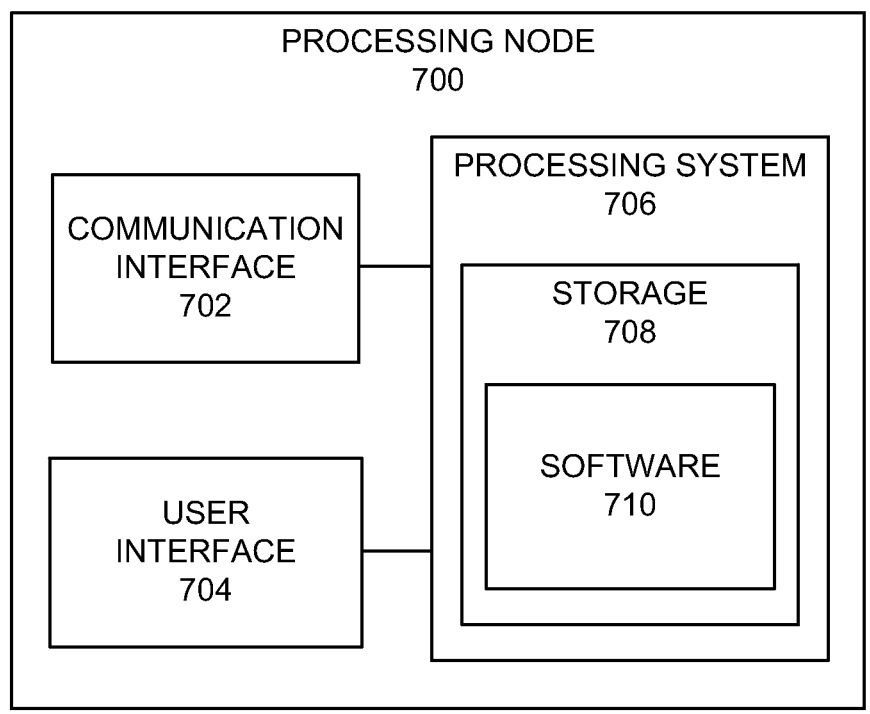
FIG. 7 illustrates an exemplary processing node.

FIG. 7 illustrates an exemplary processing node 700 comprising communication interface 702, user interface 704, and processing system 706 in communication with communication interface 702 and user interface 704. Processing node 700 is capable of paging a wireless device. Processing system 706 includes storage 708, which can comprise a disk drive, flash drive, memory circuitry, or other memory device. Storage 708 can store software 710 which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

An example of processing node 700 includes access node 104, wireless device 102, and/or a node in the communication network 106. Processing node 700 can also be an adjunct or component of a network element, such as an element of wireless device 102, access node 104, a node in the communication network 106, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of allocating physical resources in a communication system, comprising:
    determining a common periodicity of two or more allocations for a communication between a wireless device and an access node; and
    determining a permissible division of a data unit in at least two transmission time intervals in a single carrier within one of the two or more allocations.

2. The method of claim 1, further comprising determining a common size of the two or more allocations for the communication between the wireless device and the access node.

3. The method of claim 1, wherein determining the permissible division of the data unit into the two or more transmission time intervals comprises determining a permissible number of contiguous transmission time intervals into which the data unit may be divided.

4. The method of claim 1, wherein determining the permissible division of the data unit into the two or more transmission time intervals comprises determining a permissible number of non-contiguous transmission time intervals into which the data unit may be divided.

5. The method of claim 1, further comprising setting the permissible division of the data unit in the wireless device.

6. The method of claim 1, wherein the data unit is a media access control protocol data unit with a media access service data unit.

7. The method of claim 1, wherein the single carrier is comprised of a plurality of sub carriers.

8. A method of allocating physical resources in a communication system, the method comprising:
    allocating at least two transmission time intervals into which a data unit may be divided; and
    dividing the data unit into the at least two transmission time intervals in a single carrier.

9. The method of claim 8, further comprising determining a common time periodicity of at least two or more of the allocations.

10. The method of claim 8, wherein dividing the data unit into the at least two transmission time intervals comprises dividing the data unit into two or more contiguous transmission time intervals.

11. The method of claim 8, wherein dividing the data unit into the at least two transmission time intervals comprises dividing the data unit into two or more non-contiguous transmission time intervals.

12. The method of claim 8, further comprising transmitting the divided data unit from a wireless device to an access node.

13. The method of claim 8, wherein the carrier is comprised of a plurality of subcarriers.

14. A communication system configured to allocate physical resources, the communication system comprising:
    one or more network nodes configured to determine a common periodicity of two or more allocations for a communication between an access node and a wireless device and determine at least two transmission time intervals in a single carrier into which a data unit may be divided,
    wherein each network node of the one or more network node comprises a processing system coupled to a memory device.

15. The communication system of claim 14, wherein the one or more network nodes are further configured to determine a common size of the two or more allocations between the wireless device and the access node.

16. The communication system of claim 14, wherein the one or more network nodes are further configured to determine a number of permissible contiguous transmission time intervals into which the data unit may be divided.

17. The communication system of claim 14, wherein the one or more network nodes are further configured to set in the wireless device the permissible division of the data unit into in the wireless device.

18. The communication system of claim 14, wherein the one or more network nodes are further configured to divide the data unit into two or more contiguous time intervals.

19. The communication system of claim 14, wherein the one or more network nodes are further configured to divide the data unit into two or more non-contiguous time intervals.

20. The communication system of claim 14, wherein the one or more network nodes is an access node configured to transmit the divided data unit from the wireless device to the access node.

* * * * *